US011472332B1

(12) United States Patent
Salter et al.

(10) Patent No.: US 11,472,332 B1
(45) Date of Patent: Oct. 18, 2022

(54) VEHICLE HAVING EXTERIOR LIGHTING CONTROL AND METHOD

(71) Applicant: Ford Global Technologies, LLC, Dearborn, MI (US)

(72) Inventors: Stuart C. Salter, White Lake, MI (US); Kristopher Karl Brown, Dearborn, MI (US); John Robert Van Wiemeersch, Novi, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/487,415

(22) Filed: Sep. 28, 2021

(51) Int. Cl.
*B60Q 1/24* (2006.01)
*F21W 102/40* (2018.01)

(52) U.S. Cl.
CPC ............ *B60Q 1/24* (2013.01); *B60Q 2300/45* (2013.01); *B60Q 2400/40* (2013.01); *F21W 2102/40* (2018.01)

(58) Field of Classification Search
CPC .. B60Q 1/24; B60Q 2300/45; B60Q 2400/40; F21W 2102/40
See application file for complete search history.

(56) References Cited

U.S. PATENT DOCUMENTS

| 10,190,357 | B2 | 1/2019 | Kothari |
| 2007/0030136 | A1 | 2/2007 | Teshima et al. |
| 2018/0065537 | A1* | 3/2018 | Abrams ............... H05B 47/115 |

FOREIGN PATENT DOCUMENTS

| DE | 10034379 A1 | 7/2000 |
| DE | 102010019829 B4 | 1/2014 |

* cited by examiner

*Primary Examiner* — Robert J May
(74) *Attorney, Agent, or Firm* — Frank Lollo; Price Heneveld LLP (57) ABSTRACT

A vehicle having controlled exterior lighting is provided including a plurality of lighting devices oriented on the exterior of the vehicle to illuminate areas proximate to the vehicle, a plurality of sensors located on the vehicle for sensing a user relative to the vehicle and generating sensed signals indicative of the sensed user, and a transceiver for communicating with another vehicle. The vehicle also includes a controller processing the sensed signals generated by the plurality of sensors, and detecting the user proximate to the vehicle and tracking movement of the user proximate to the vehicle, the controller further activating one or more of the plurality of exterior lighting devices to selectively illuminate areas that track the user and further communicating with the other vehicle to illuminate the user with lighting devices on the other vehicle.

20 Claims, 5 Drawing Sheets

VEHICLE HAVING EXTERIOR LIGHTING CONTROL AND METHOD

FIELD OF THE DISCLOSURE

The present disclosure generally relates to vehicle lighting, and more particularly relates to a system and method of controlling exterior lighting for a user.

BACKGROUND OF THE DISCLOSURE

Motor vehicles are commonly equipped with various closure doors which may be power actuated to allow ingress and egress of the vehicle passenger compartment. Vehicles are also commonly equipped with exterior lighting to illuminate areas around the vehicle. It would be desirable to provide for control of the exterior lighting to illuminate areas to assist a user proximate to the vehicle.

SUMMARY OF THE DISCLOSURE

According to a first aspect of the present disclosure, a vehicle having controlled exterior lighting is provided. The vehicle having controlled exterior lighting includes a plurality of lighting devices oriented on the exterior of the vehicle to illuminate areas proximate to the vehicle, a plurality of sensors located on the vehicle for sensing a user relative to the vehicle and generating sensed signals indicative of the sensed user, and a transceiver for communicating with another vehicle. The vehicle also includes a controller processing the sensed signals generated by the plurality of sensors, and detecting the user proximate to the vehicle and tracking movement of the user proximate to the vehicle, the controller further activating one or more of the plurality of exterior lighting devices to selectively illuminate areas that track the user and further communicating with the other vehicle to illuminate the user with lighting devices on the other vehicle.

Embodiments of the first aspect of the disclosure can include any one or a combination of the following features:
- the vehicle and the other vehicle are located in a parking garage;
- the vehicle employs one or more of the plurality of sensors to track an area proximate to an entryway to the parking garage;
- the controller activates only sensors that sense the area proximate to the entryway until a user is detected;
- the plurality of sensors comprises one or more of a camera, a radar, and an ultrasonic sensor;
- the plurality of sensors comprises a plurality of radar sensors;
- the plurality of sensors comprises a plurality of cameras;
- the plurality of sensors comprises a plurality of ultrasonic sensors;
- the exterior lighting device comprises selectable lighting devices that illuminate a front side of the vehicle, a rear side of the vehicle and opposite lateral sides of the vehicle; and
- the light illumination transitions from the vehicle to the other vehicle when a user moves in a location from the vehicle to the other vehicle.

According to a second aspect of the present disclosure, a vehicle having controlled exterior lighting for illuminating areas within a garage is provided. The vehicle includes a plurality of lighting devices oriented on the exterior of the vehicle to illuminate areas proximate to the vehicle, a plurality of sensors located on the vehicle for sensing a user relative to the vehicle and generating sensed signals indicative of the sensed user, wherein the plurality of sensors further sense a sensing area proximate a door of the garage, and a transceiver for communicating with another vehicle. The vehicle also includes a controller processing the sensed signals generated by the plurality of sensors, and detecting the user proximate to the door of the garage, activating additional sensors to enlarge the sensing area and tracking movement of the user proximate to the vehicle, the controller further activating one or more of the plurality of exterior lighting devices to illuminate areas that track the user and further communicating with the other vehicle to illuminate the user with lighting devices on the other vehicle.

Embodiments of the second aspect of the disclosure can include any one or a combination of the following features:
- the controller activates only sensors that sense the area proximate to the entry until a user is detected;
- the plurality of sensors comprises one or more of a camera, a radar, and an ultrasonic sensor;
- the plurality of sensors comprises a plurality of radar sensors;
- the plurality of sensors comprises a plurality of cameras;
- the plurality of sensors comprises a plurality of ultrasonic sensors; and
- the exterior lighting device comprises selectable lighting devices that illuminate a front side of the vehicle, a rear side of the vehicle and opposite lateral sides of the vehicle.

According to a third aspect of the present disclosure, a method of illuminating light for a user proximate to an exterior of a vehicle is provided. The method includes the steps of sensing the user proximate to the exterior of the vehicle with one or more sensors on the vehicle, illuminating an area of the user proximate to the vehicle with one or more lighting devices on the vehicle, tracking movement of the user proximate to the vehicle, communicating a location of the user with another vehicle, and illuminating the area of the user with one or more lighting devices on the other vehicle.

Embodiments of the third aspect of the disclosure can include any one or a combination of the following features:
- the vehicle and the other vehicle are located in a garage; and
- the vehicle employs one or more of the plurality of sensors to track an area proximate to an entrance to the garage.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
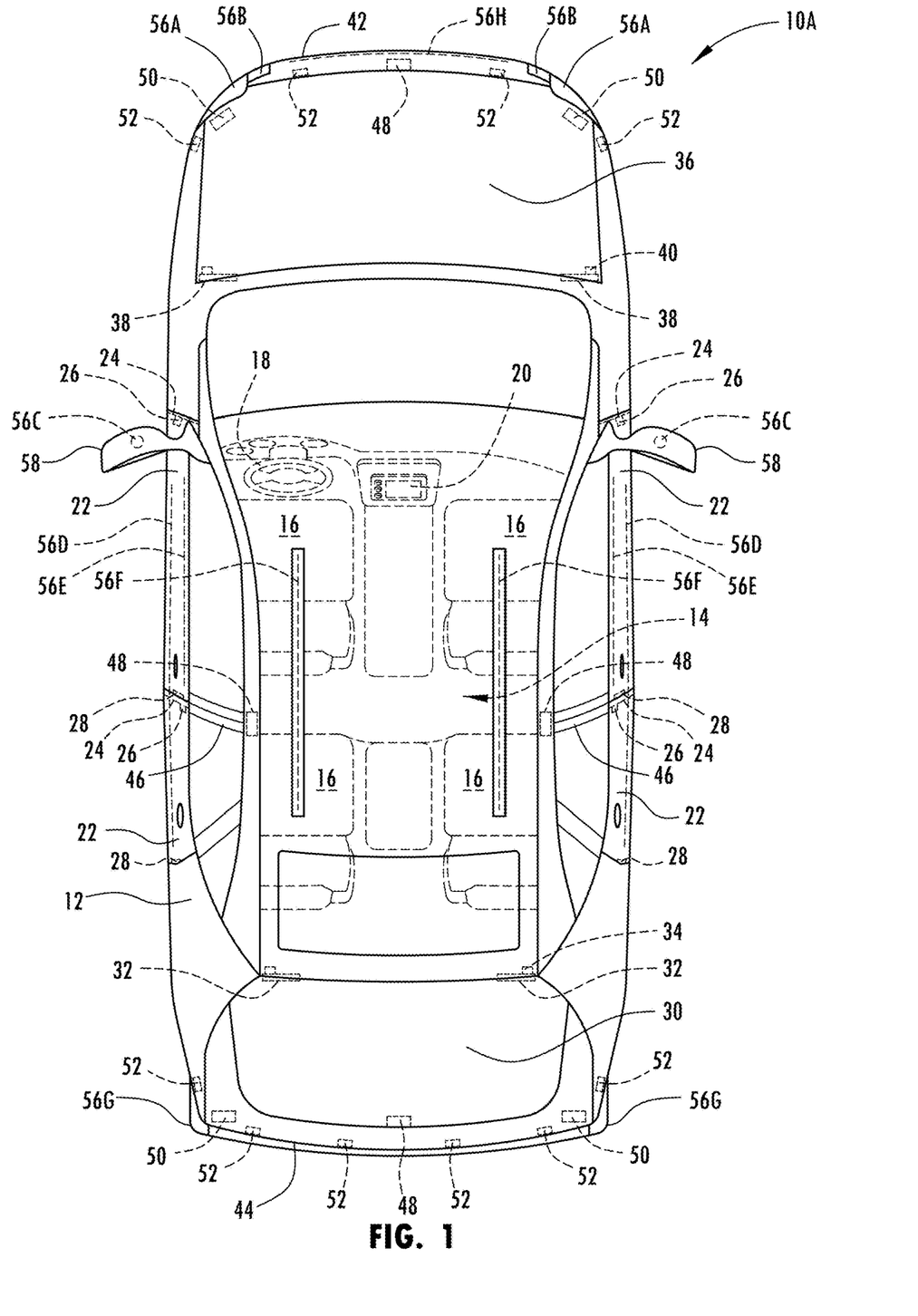
FIG. 1 is a top schematic view of a motor vehicle equipped with power doors, sensors, and exterior lighting and controls for controlling the lighting, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having exterior lighting and control of lighting areas to accommodate a user. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10A is generally illustrated having a cabin interior 14 defined by a vehicle body 12 and configured with passenger seating for transporting passengers in the vehicle 10A. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10A may be equipped with a steering wheel 18 located in front of the driver seat to enable the driver to steer the vehicle road wheels. Additionally, one or more human machine interfaces (HMI), such as a touchscreen display 20, audio speakers, microphone, etc., may be provided on the vehicle 10A to communicate with the driver and one or more passengers in the vehicle 10A.

The vehicle 10A is equipped with powered doors and user detection and controls to assist with operation of the doors of the vehicle 10A and allow the driver and passengers to enter the vehicle 10A. The vehicle 10A has a plurality of powered closure doors that include four side passenger doors 22, with two doors on each opposite lateral side of the vehicle 10A. In addition, the vehicle 10A has a powered rear trunk door 30 at the rear of the vehicle 10A and a powered front trunk door 36 at the front of the vehicle 10A. Each of the powered doors 22, 30 and 36 may close a space such as a space of the cabin interior 14 in the closed position and allow access to the cabin interior 14 in an open position. The powered doors 22, 30 and 36 are power-operated doors, each having an actuator, such as an electric motor, for moving the corresponding door between the closed and open door positions. The actuators may move the powered doors between the open and closed door positions in response to detecting a user approaching the vehicle 10A and attempting to enter the vehicle 10A or a user input, such as an input entered on a vehicle mounted switch panel, a key fob, a smartphone or other electronic device. The powered doors may be opened and closed by the actuators in response to detecting movement or position of a driver or potential passenger approaching or departing the vehicle 10A. Additionally, the powered doors may be controlled to open partway or at different speeds.

It should be appreciated that the vehicle 10A may include additional rows of seating and powered doors, such as may be found on large SUVs, vans and buses. For example, the vehicle 10A may include two side doors or more than four side doors. The vehicle 10A may be a motor vehicle, such as a wheeled car, truck, SUV, van or bus, for example, having one or more powered doors. Each of the powered doors moves relative to the body 12 of the vehicle 10A between a closed door position and an extended open door position and therefore requires space to move between the closed and open door positions. The vehicle controls advantageously assist with operation of the powered doors and/or the vehicle 10A and controls vehicle exterior lighting to assist a user proximate to the vehicle.

The vehicle 10A is shown in FIG. 1 as having four side powered doors 22, with two of the side doors 22 located forward and adjacent to the front row of seats 16 and the other two of the side doors 22 located rearward thereof and adjacent to the second or rear row of seats 16. Each of the side doors 22 may include a door panel and window that pivots about hinges 24 generally along a vertical axis to allow the door 22 to swing outward through a swing path to an open door position or inward to a flush position with the body 12 of the vehicle 10A where it may be latched via latch 28 in the closed door position. The side doors 22 each includes an actuator such as an electric motor 26 which may be located at or near one of the hinges 24 to power actuate the powered door 22 between the closed and open door positions.

The vehicle 10A has a rear trunk 30 and a front trunk 36, each of which pivots between a closed position and an open position. The rear trunk 30 pivots about a pair of horizontal hinges 32 and is actuated by an actuator, such as an electric motor 34. The front trunk 36 likewise has a pair of horizontal hinges 38 and is actuated by an actuator, such as an electric motor 40.

The vehicle 10A is equipped with a plurality of sensors that are located and oriented on the vehicle 10A for sensing objects such as potential users, e.g., driver and passengers expected to enter the vehicle 10A or passing by the vehicle 10A and obstacles outside of the vehicle 10A and within a space surrounding the vehicle 10A. The plurality of sensors generate signals indicative of the sensed objects. The plurality of sensors may include a plurality of imaging devices, such as two side view cameras 48, which are shown located on opposite lateral sides of the vehicle 10A shown at or near the B-pillars 46, a front view camera 48 shown in a front fascia 42 of the vehicle 10A and a rear view camera 48 shown in a rear fascia 44 of the vehicle 10A. Each of the cameras 48 may acquire images of regions around the perimeter of and proximate to the vehicle 10A. The acquired images may be processed by video processing to identify the objects such as one or more users (e.g., people) and the position of the objects relative to the vehicle 10A.

The plurality of sensors may also include radar sensors 50 shown located at each of the four corners of the vehicle 10A for sensing objects located outside of the vehicle and within regions surrounding the vehicle 10A. The radar sensors 50 transmit radio waves and process their reflections from objects to determine distance to the object and location of the object. Further, the plurality of sensors may include a plurality of ultrasonic sensors 52 shown located at various locations along the front portion and rear portions of the vehicle 10A. In the examples shown, six ultrasonic sensors 52 are shown spaced apart and located at or proximate to the rear fascia 44 and four ultrasonic sensors 52 are shown spaced apart and located at or proximate to the front fascia 42. As such, the radar and ultrasonic sensors 50 and 52 may detect the location, size and relative distance from the vehicle 10A to the detected objects. It should be appreciated that other sensors may be employed by the vehicle 10A to sense objects relative to the vehicle 10A, and generate sensed signals that may be used to identify each object and the distance and location of the sensed object relative to the vehicle 10A for use in assisting with the illumination of exterior lighting and the powered doors of the vehicle 10A.

The vehicle 10A is equipped with vehicle exterior lighting including a plurality of lighting devices 56A-56H located at various locations on the vehicle to selectively illuminate different regions or areas outside of and proximate to the vehicle 10A. The exterior lighting devices may include taillight lamps 56G located in each of the rear taillights, mirror lamps 56C located in side view mirrors 58 which may include puddle lamps and spotlights, signature lighting 56E near the belt line, fog lighting devices 56B, headlights 56A located in the front of the vehicle, running board lights 56D, grille lights 56H, roof rack lighting devices 56F, and other types of lighting that provide exterior lighting of areas proximate to the vehicle 10A. The headlights 56A and other lighting devices may be employed at a reduced power to provide reduced power consumption. It should be appreciated that the vehicle exterior lighting may include illuminating one or more of the exterior lighting devices 56A-56H in a manner to create an illuminated pathway to illuminate a user as the user moves relative to the vehicle. As such, a user is able to move throughout a garage and utilize the vehicle exterior lighting to illuminate the pathway.

Figure 2:
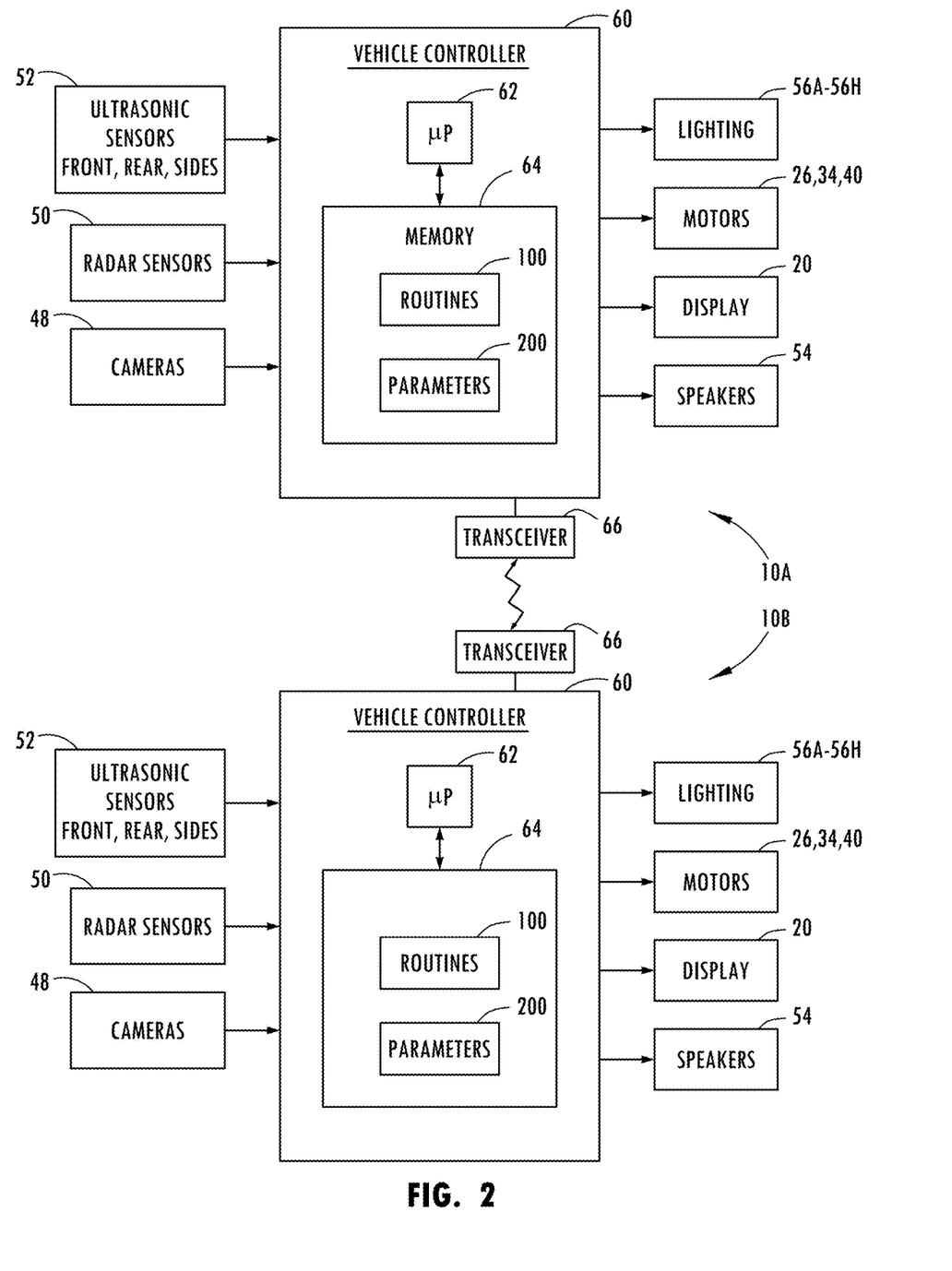
FIG. 2 is a block diagram of two vehicles each having a controller configured to sense a user and control the exterior lighting to illuminate areas proximate to the vehicles.

Referring to FIG. 2, the vehicle 10A, also referred to as the first vehicle, is shown along with another vehicle 10B, also referred to as a second vehicle. The second vehicle 10B is configured similar to the first vehicle 10A shown in FIG. 1. Both first and second vehicles 10A and 10B each have a vehicle controller 60 that detects a user, such as a driver or passenger located or travelling proximate to the corresponding vehicle and controls exterior lighting to illuminate a pathway for a user. The controller 60 may also detect a user attempting to enter the vehicle and controls one or more powered doors to open or close the door(s). The vehicle controller 60 in each vehicle may include control circuitry, such as a microprocessor 62 and memory 64. It should be appreciated that the vehicle controller 60 may be comprised of analog and/or digital control circuitry. Stored in memory 64 are one or more routines including routine 100 which may be executed by the microprocessor 62. In addition, various stored parameters 200 including garage dimensions may be stored in memory 64 and processed by the microprocessor 62. The stored parameters 200 may include measured garage dimensions and features including door entryways. The vehicle controller 60 receives inputs from the plurality of sensors located on the vehicle 10A including the cameras 48, radar sensors 50 and ultrasonic sensors 52. In addition, the vehicle controller 60 generates one or more outputs to control the lighting devices 56A-56H and the door actuating motors 26, 34 and 40 and may provide outputs to one or more HMIs such as the touchscreen display 20 and audio speakers 54 located on the vehicle 10A.

The controller 60 provides outputs to each of the electric motors 26 associated with the side powered doors 22. As such, the controller 60 may control actuation of the side powered doors 22 between the open and closed door positions. In the event that a user such as the driver of the first vehicle 10A is approaching the first vehicle 10A, the driver door may be actuated by the motor 26 to the open position based on a user input or detected intention of the user entering the first vehicle 10A. The second vehicle 10B may detect the driver of the second vehicle 10B attempting to enter the second vehicle 10B and may actuate the motor 26 and open the door. The vehicle 10A may further communicate with the second vehicle 10B and generate a message to communication the second vehicle 10B that a user is travelling from an area proximate the first vehicle 10A to an area proximate the second vehicle 10B so that exterior lighting on the second vehicle 10B may be actuated to illuminate the user and the user's pathway. If a passerby e.g., pedestrian, is passing by one vehicle, the passerby may be illuminated with light output from either or both vehicles. Similarly, the other doors of the first and second vehicles 10A and 10B, such as the trunk 30 and frunk 36 may likewise be controlled based on a user input or identifying a user intending to access the corresponding door.

The vehicle controller 60 of both vehicles 10A and 10B may further communicate the messages and data via transceivers 66 to provide vehicle-to-vehicle communication. The vehicle-to-vehicle communication may include sharing locations of users relative to the corresponding vehicle or vehicles. Additionally, the transceiver 66 of one vehicle may acquire data from the other vehicle such as the stored garage parameters and availability of specific selective exterior lights. Transceiver 66 of first vehicle 10A may communicate with users and other vehicles such as second vehicle 10B.

The controller 60 on the first vehicle 10A may communicate via the transceiver 66 with a transceiver 66 on the second vehicle 10B and may communicate with one or more further vehicles. The communication may be wireless communication such as via RF signals employed by Bluetooth®, Ultra Wide-Band (UWB) WiFi, cellular data, vehicle-to-vehicle (V2V) communication, or other forms of wireless communication. For example, the controller 60 on the first vehicle 10A may communicate with the controller 60 on the second vehicle 10B to obtain sensed garage dimension data for use in assisting with sensing and light illumination.

Figure 3:
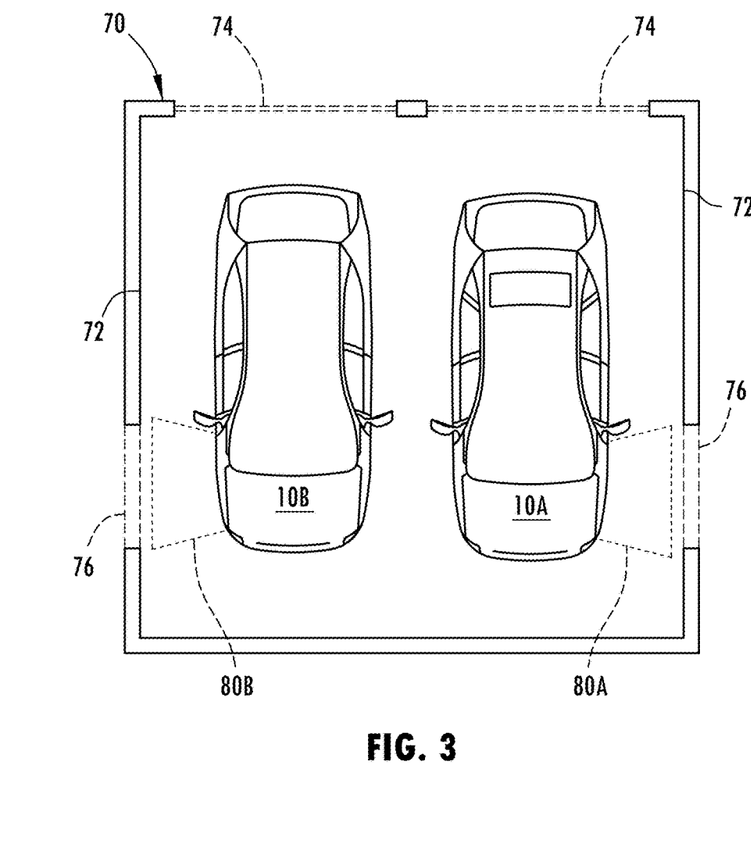
FIG. 3 is a displayed view of two vehicles parked in a parking garage and providing light illumination for a user at one location proximate to the vehicles.

An exemplary configuration of a parking scenario for providing light illumination for a user with two parked vehicles 10A and 10B in a garage 70 is illustrated in FIGS. 3-6. In FIG. 3, the garage 70 is generally shown configured as a two-car garage with a pair of garage doors 74 for parking two motor vehicles, side-by-side, as shown. However, the garage 70 may otherwise be configured to park more vehicles in various parking configurations. The garage 70 includes walls 72, such as four walls that generally define a rectangular shape of the garage 70, in one example. In addition, the garage 70 may include one or more side doors 76 that open and close to allow access to the garage 70, such as access from a house or otherwise from the outside of the garage 70. The garage 70 may further include one or more vehicle garage doors 74 that in an open position allow one or more vehicles to enter or exit the garage 70. In the configuration shown, the first vehicle 10A and a second vehicle 10B are shown parked side-by-side in the garage 70, with each vehicle having power closure doors that can be operated between the open and closed positions and exterior lighting for selectively illuminating areas proximate to the first and second vehicles 10A and 10B.

The presence and movement of a user 90 such as a driver, passenger or other person is sensed using one or more of the sensors of the sensor arrangement equipped on a vehicle, such as using the radar and/or ultrasonic sensors and/or cameras. Each vehicle may monitor a user to determine the path of the user and if the user 90 is attempting to enter a vehicle and, if not, the vehicle doors remain closed. The one or more sensors may detect a user entering the garage 70 via an entrance door such as side doors 76. The detection of the user 90 may occur by utilizing one or more sensors, such as radar sensors to detect only the area proximate to one or more of the side doors 76 or entryways so as to consume reduced power from the vehicle battery as illustrated in FIG. 3 with vehicles 10A and 10B emitting small sensor fields 80A and 80B, respectively. The sensor arrangement may detect a user 90 entering the side door 76 in the garage 70 and moving relative to the vehicles 10A and 10B to travel around the outside of the first vehicle 10A and the second vehicle 10B adjacent to it. In doing so, the sensors detect the position of the user 90 with the controller and provide a pathway of light illumination for the user 90. It should be appreciated that the sensor arrangement may sense the user 90 and movement of the user 90 utilizing one or more of a camera, ultrasonic sensors, and radar sensors, according to one example. It should further be appreciated that the presence of a user and the position of the user may be determined based on the location of an electronic device associated with the user, such as a key fob or phone or other wireless communication device that may sense the location of the user. The determination of the user's location may include using global positioning system (GPS) data. This may also include sensing location of an electronic device via RF signal communication with a plurality of sensors onboard the vehicle and performing an RF signal triangulation to determine the location of the device associated with the user.

To determine whether or not a user is attempting to enter the first vehicle 10A via a powered door, the first vehicle 10A may employ an authentication process which looks for the presence of a user approaching the vehicle 10A and the intention of the user to enter the vehicle 10A. The authentication process may look at the position of the user relative to the vehicle 10A, image recognition recognizing the face of the user looking or staring towards a door handle, recognizing the presence of a key fob or other recognizable electronic device associated with the vehicle 10A, or recognizing the facial characteristics of the user as a user of the vehicle 10A, and monitoring the body position of the user, such as whether the user is facing the door handle indicative of a user attempting to access the vehicle 10A. Other forms of identifying the user attempting to enter the first vehicle 10A or the second vehicle 10B may include receiving an input command from the user via an electronic device, such as a key fob or cell phone activating the motors on the vehicle to actuate the doors to the open position.

Figure 4:
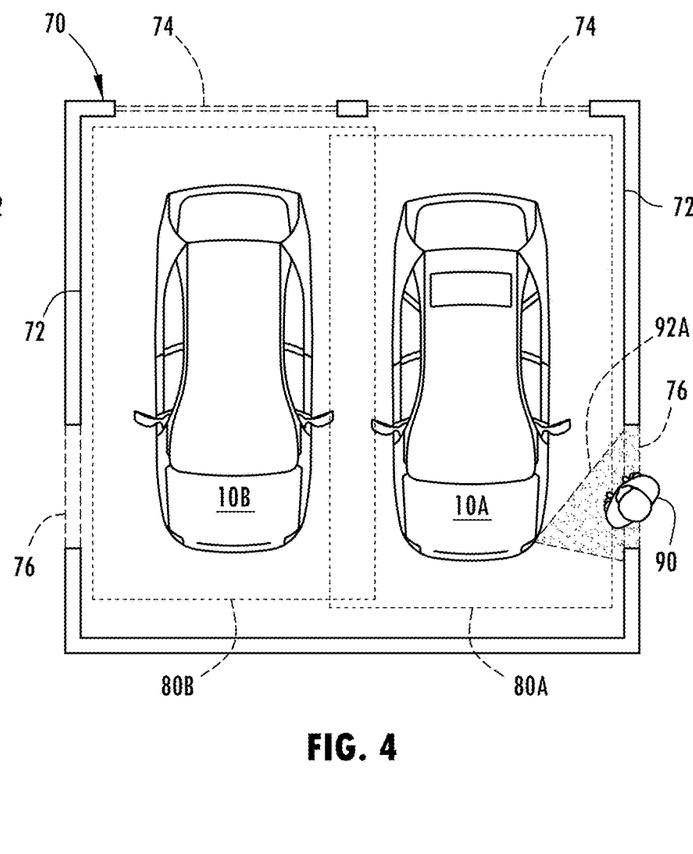
FIG. 4 is a displayed view of the two vehicle in a parking garage with a user at a second location, according to one example.

Once a user 90 is detected entering the side door 76 of the garage 70, the vehicle 10A may enlarge the sensor field 80A by turning on other sensors as part of the sensor arrangement to detect movement of the user 90 and track the movement of the user 90 within the garage 70. In addition, the first vehicle 10A may notify the second vehicle 10B of the presence of a user 90 such that second vehicle 10B may enlarge the sensor field 80B by turning on additional sensors as part of the sensor arrangement. As a result, first vehicle 10A and second vehicle 10B are able to limit power consumption for sensing during the initial detection of a user and may expand the sensor field when a user is determined to be within the garage 70.

Figure 5:
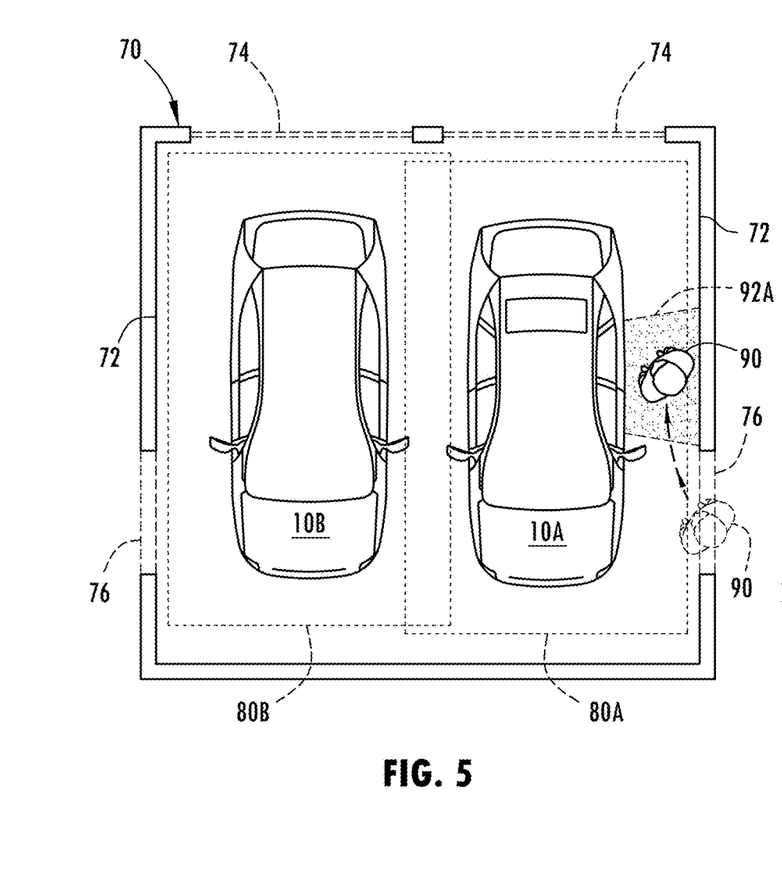
FIG. 5 is a displayed view of the two vehicles in a parking garage sensing a user approaching a door of the garage and illuminating areas proximate to the vehicles.

When the user 90 is detected entering side door 76, vehicle 10A activates one or more exterior lighting devices to illuminate the user 90 on the user's pathway. As the user moves within the garage 70 from a first location to a second location as shown in FIG. 5, the first vehicle 10A tracks the movement of the user 90 with the enlarged sensor field 80A and selectively activates different exterior lighting devices so as to illuminate an area generally proximate to the user 90.

Figure 6:
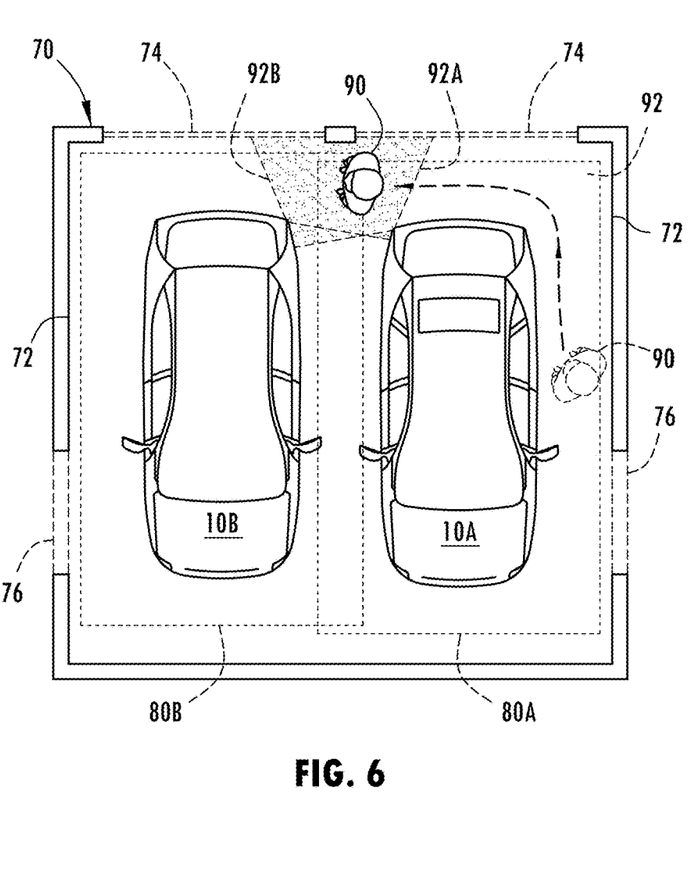
FIG. 6 is a displayed view of the two vehicles in a parking garage further illustrating the user moving around the vehicles within controlled lighting areas.

As the user 90 proceeds to move further about the garage 70 from a location proximate to the first vehicle 10A to a location proximate to the second vehicle 10B, the first vehicle 10A notifies the second vehicle 10B of the presence of the user approaching the second vehicle 10B. The first vehicle 10A may instruct the second vehicle 10B to activate one or more lighting devices on the second vehicle 10B to illuminate a region proximate to the user as the user approaches the second vehicle 10B. The second vehicle 10B may independently sense a location of the user 90 once the user is within the sensor field 80B. As the user 90 moves further away from the first vehicle 10A, the first vehicle 10A may turn off the lighting devices and the second vehicle 10B may track and illuminate the user 90 while the user remains within the garage 70 in close proximity to the second vehicle 10B.

In the embodiment shown, a limited number of sensors may be employed to initially detect a user 90 entering a side door 76 of the garage 70, however, it should be appreciated that other sensors may be employed to detect a user 90 entering the garage. For example, a home security system or home installed sensors, such as radar, ultrasonic and camera may be employed to detect a user proceeding through a door 76 to enter the garage 70, such as from a house or exterior of the garage 70. The first and second vehicles 10A and 10B may communicate with a transceiver associated with the home to receive signals indicating that a user is entering the garage 70.

It should be appreciated that the first and second vehicles 10A and 10B may illuminate a user proximate to the vehicles at a location outside of a garage. For example, when a user approaches the first and second vehicles 10A and 10B in a parking lot that is not bordered with walls, the first and second vehicles 10A and 10B may track the user 90 and illuminate the user 90 and the path of the user and communicate with each other to handoff the tracking and illumination as described above, absent the presence of a bordered wall garage 70.

Figure 7:
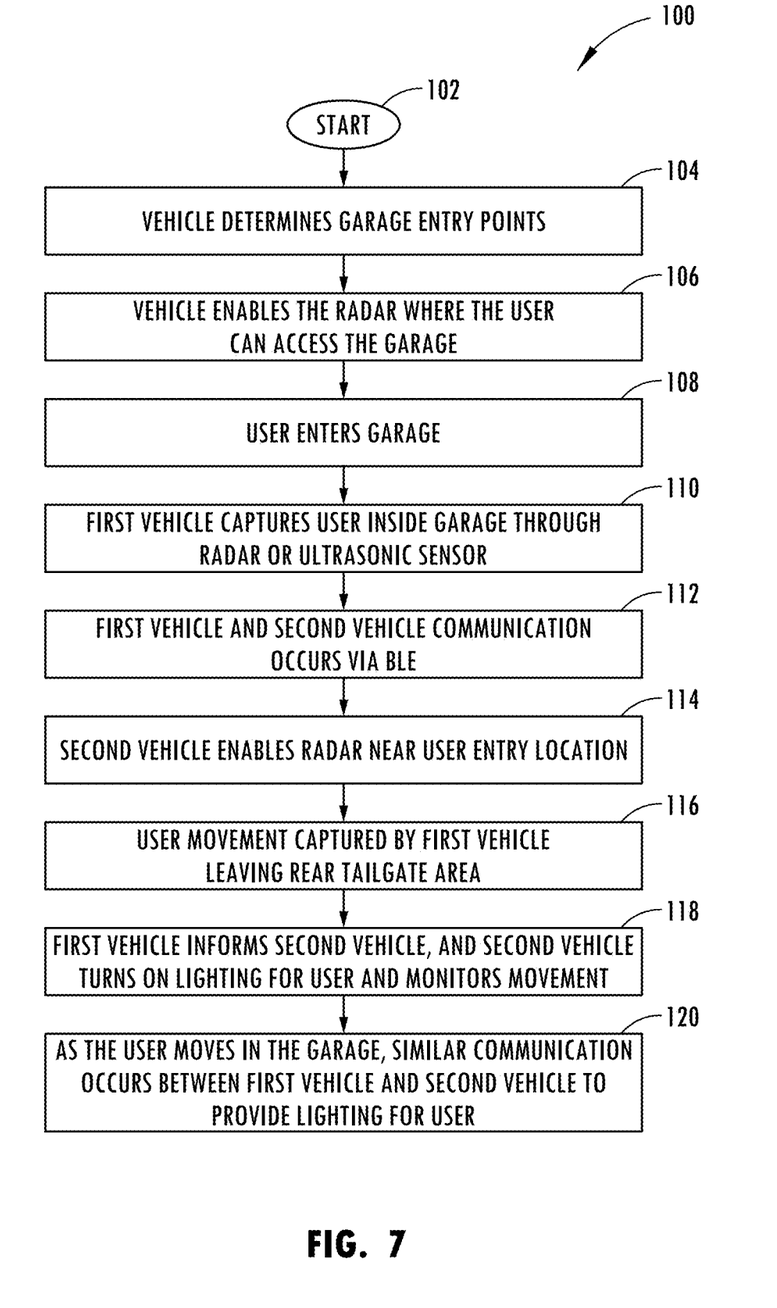
FIG. 7 is a flow diagram illustrating a method of sensing a user and illuminating areas proximate to the two vehicles.

Referring to FIG. 7, routine 100 is illustrated according to one example starting at step 102 and proceeding to step 104 where a vehicle determines the garage entry points. The entry points may include doors through which a user may enter or exit. Next, at step 106, the vehicle enables the radar or other sensors to sense areas where the user can access the garage. Routine 100 then proceeds to step 108 and detects when a user enters the garage via an access point, such as a door. The first vehicle then captures the user in the garage by using radar or ultrasonic sensors, for example. The first vehicle and second vehicle communicate via wireless communication at step 112. At step 114, a second vehicle enables the radar or other sensors near the user entry location. Next, at step 116, the user movement is captured by the first vehicle leaving a rear tailgate area of the vehicle. Next, at step 118, the first vehicle informs a second vehicle and the second vehicle turns on lighting for the user and monitors movement of the user. Finally, at step 120, as the user moves in or throughout the garage, a similar communication occurs between the first vehicle and the second vehicle to provide lighting for the user.

Accordingly, the vehicle 10A advantageously employs vehicle sensing an exterior lighting assist to assists a user moving proximate to the vehicle, and another vehicle particularly for a user within a garage. This advantageously allows the user to proceed to travel along an illuminated path proximate to two or more vehicles.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle having controlled exterior lighting, the vehicle comprising:
   a plurality of lighting devices oriented on the exterior of the vehicle to illuminate areas proximate to the vehicle;
   a plurality of sensors located on the vehicle for sensing a user relative to the vehicle and generating sensed signals indicative of the sensed user;
   a transceiver for communicating with another vehicle; and
   a controller processing the sensed signals generated by the plurality of sensors, and detecting the user proximate to the vehicle and tracking movement of the user proximate to the vehicle, the controller further activating one or more of the plurality of exterior lighting devices to selectively illuminate areas that track the user and further communicating with the other vehicle to illuminate the user with lighting devices on the other vehicle.

2. The vehicle of claim 1, wherein the vehicle and the other vehicle are located in a parking garage.

3. The vehicle of claim 2, wherein the vehicle employs one or more of the plurality of sensors to track an area proximate to an entryway to the parking garage.

4. The vehicle of claim 3, wherein the controller activates only sensors that sense the area proximate to the entryway until a user is detected.

5. The vehicle of claim 1, wherein the plurality of sensors comprises one or more of a camera, a radar, and an ultrasonic sensor.

6. The vehicle of claim 1, wherein the plurality of sensors comprises a plurality of radar sensors.

7. The vehicle of claim 1, wherein the plurality of sensors comprises a plurality of cameras.

8. The vehicle of claim 1, wherein the plurality of sensors comprises a plurality of ultrasonic sensors.

9. The vehicle of claim 1, wherein the exterior lighting device comprises selectable lighting devices that illuminate a front side of the vehicle, a rear side of the vehicle and opposite lateral sides of the vehicle.

10. The vehicle of claim 1, wherein the light illumination transitions from the vehicle to the other vehicle when a user moves in a location from the vehicle to the other vehicle.

11. A vehicle having controlled exterior lighting for illuminating areas within a garage, the vehicle comprising:

a plurality of lighting devices oriented on the exterior of the vehicle to illuminate areas proximate to the vehicle;

a plurality of sensors located on the vehicle for sensing a user relative to the vehicle and generating sensed signals indicative of the sensed user, wherein the plurality of sensors further sense a sensing area proximate a door of the garage;

a transceiver for communicating with another vehicle; and a controller processing the sensed signals generated by the plurality of sensors, and detecting the user proximate to the door of the garage, activating additional sensors to enlarge the sensing area and tracking movement of the user proximate to the vehicle, the controller further activating one or more of the plurality of exterior lighting devices to illuminate areas that track the user and further communicating with the other vehicle to illuminate the user with lighting devices on the other vehicle.

12. The vehicle of claim 11, wherein the controller activates only sensors that sense the area proximate to the entry until a user is detected.

13. The vehicle of claim 11, wherein the plurality of sensors comprises one or more of a camera, a radar, and an ultrasonic sensor.

14. The vehicle of claim 11, wherein the plurality of sensors comprises a plurality of radar sensors.

15. The vehicle of claim 11, wherein the plurality of sensors comprises a plurality of cameras.

16. The vehicle of claim 11, wherein the plurality of sensors comprises a plurality of ultrasonic sensors.

17. The vehicle of claim 11, wherein the exterior lighting device comprises selectable lighting devices that illuminate a front side of the vehicle, a rear side of the vehicle and opposite lateral sides of the vehicle.

18. A method of illuminating light for a user proximate to an exterior of a vehicle, the method comprising:

sensing the user proximate to the exterior of the vehicle with one or more sensors on the vehicle;

illuminating an area of the user proximate to the vehicle with one or more lighting devices on the vehicle;

tracking movement of the user proximate to the vehicle;

communicating a location of the user with another vehicle; and illuminating the area of the user with one or more lighting devices on the other vehicle.

19. The method of claim 18, wherein the vehicle and the other vehicle are located in a garage.

20. The method of claim 19, wherein the vehicle employs one or more of the plurality of sensors to track an area proximate to an entrance to the garage.

* * * * *